United States Patent
Schorr et al.

(10) Patent No.: US 9,747,710 B2
(45) Date of Patent: Aug. 29, 2017

(54) METHOD, SYSTEM, AND COMPUTER-READABLE MEDIUM FOR CREATING AND LAYING OUT A GRAPHIC WITHIN AN APPLICATION PROGRAM

(71) Applicant: Microsoft Technology Licensing, LLC, Redmond, WA (US)

(72) Inventors: Janet L. Schorr, Seattle, WA (US); Stephen T. Wells, Seattle, WA (US); Matthew Kotler, Kenmore, WA (US); Thomas C. Underhill, Seattle, WA (US); Scott A. Sherman, Seattle, WA (US); Ilan Berker, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 538 days.

(21) Appl. No.: 14/307,668

(22) Filed: Jun. 18, 2014

(65) Prior Publication Data
US 2014/0292767 A1     Oct. 2, 2014

Related U.S. Application Data

(63) Continuation of application No. 12/035,878, filed on Feb. 22, 2008, now Pat. No. 8,791,955, which is a
(Continued)

(51) Int. Cl.
*G06T 11/20*      (2006.01)
*G06F 17/21*      (2006.01)
(Continued)

(52) U.S. Cl.
CPC ............ *G06T 11/206* (2013.01); *G06F 17/21* (2013.01); *G06F 17/243* (2013.01); *G06T 11/60* (2013.01); *G06F 17/212* (2013.01)

(58) Field of Classification Search
CPC ...... G06F 17/21; G06F 17/212; G06F 17/243; G06T 7/004; G06T 7/0022; G06T 7/0079; G06T 11/206; G06T 11/60
See application file for complete search history.

(56) References Cited

U.S. PATENT DOCUMENTS

| 4,531,150 A | 7/1985 | Amano |
| 4,686,522 A | 8/1987 | Hernandez et al. |

(Continued)

FOREIGN PATENT DOCUMENTS

| CN | 1530833 A | 9/2004 |
| EP | 0 431 638 A1 | 6/1991 |

(Continued)

OTHER PUBLICATIONS

Indian Office Action in Application 2284/DEL/2005, mailed Feb. 17, 2015, 2 pgs.
(Continued)

*Primary Examiner* — Michelle L Sams (57) ABSTRACT

A method, apparatus, and computer-readable medium are provided for creating and laying out a graphic within a drawing application program. The method includes receiving a data model defining a set of data and data relationships to be represented in the graphic, receiving a graphic definition describing the mapping of the data from the data model to a set of algorithms, algorithm parameters, constraints, constraint rules, and shape properties, determining a shape size and position for the layout nodes utilizing the set of algorithms, constraints, and constraint rules from the graphic definition, and creating a list of shapes and shape properties for the graphic, including size and position. The method further includes determining if the graphic fits a given layout into a specific area based on the set of constraint values and if the graphic does not fit the specific area, then modifying the set of constraint values using the constraint rules.

27 Claims, 5 Drawing Sheets

Related U.S. Application Data continuation of application No. 10/955,271, filed on Sep. 30, 2004, now Pat. No. 7,348,982.

(51) Int. Cl.
*G06F 17/24* (2006.01)
*G06T 11/60* (2006.01)

(56) References Cited

U.S. PATENT DOCUMENTS

| | | | |
|---|---|---|---|
| 4,996,665 | A | 2/1991 | Nomura |
| 5,214,755 | A | 5/1993 | Mason |
| 5,426,729 | A | 6/1995 | Parker |
| 5,509,112 | A | 4/1996 | Doi et al. |
| 5,535,134 | A | 7/1996 | Cohn et al. |
| 5,557,722 | A | 9/1996 | DeRose et al. |
| 5,596,691 | A | 1/1997 | Good et al. |
| 5,619,631 | A | 4/1997 | Schott |
| 5,649,216 | A | 7/1997 | Sieber |
| 5,669,006 | A | 9/1997 | Joskowicz et al. |
| 5,673,401 | A | 9/1997 | Volk et al. |
| 5,732,229 | A | 3/1998 | Dickinson |
| 5,818,447 | A | 10/1998 | Wolf et al. |
| 5,867,386 | A | 2/1999 | Hoffberg et al. |
| 5,872,867 | A | 2/1999 | Bergen |
| 5,903,902 | A | 5/1999 | Orr et al. |
| 5,909,220 | A | 6/1999 | Sandow |
| 5,956,043 | A | 9/1999 | Jensen |
| 5,956,737 | A | 9/1999 | King et al. |
| 5,999,731 | A | 12/1999 | Yellin et al. |
| 6,057,842 | A | 5/2000 | Knowlton et al. |
| 6,057,858 | A | 5/2000 | Desrosiers |
| 6,072,480 | A | 6/2000 | Gorbet et al. |
| 6,081,816 | A | 6/2000 | Agrawal |
| 6,161,098 | A | 12/2000 | Wallman |
| 6,166,738 | A | 12/2000 | Robertson et al. |
| 6,173,286 | B1 | 1/2001 | Guttman et al. |
| 6,189,132 | B1 | 2/2001 | Heng et al. |
| 6,204,849 | B1 | 3/2001 | Smith |
| 6,204,859 | B1 | 3/2001 | Jouppi et al. |
| 6,256,650 | B1 | 7/2001 | Cedar et al. |
| 6,289,502 | B1 | 9/2001 | Garland et al. |
| 6,289,505 | B1 | 9/2001 | Goebel |
| 6,292,194 | B1 | 9/2001 | Powell, III |
| 6,301,704 | B1 | 10/2001 | Chow et al. |
| 6,305,012 | B1 | 10/2001 | Beadle et al. |
| 6,308,322 | B1 | 10/2001 | Serocki et al. |
| 6,320,602 | B1 | 11/2001 | Burkardt et al. |
| 6,324,686 | B1 | 11/2001 | Komatsu et al. |
| 6,405,225 | B1 | 6/2002 | Apfel et al. |
| 6,448,973 | B1 | 9/2002 | Guo et al. |
| 6,593,933 | B1 | 7/2003 | Xu et al. |
| 6,667,750 | B1 | 12/2003 | Halstead et al. |
| 6,691,282 | B1 | 2/2004 | Rochford et al. |
| 6,715,130 | B1 | 3/2004 | Eiche et al. |
| 6,774,899 | B1 | 8/2004 | Ryall et al. |
| 6,791,582 | B2 | 9/2004 | Linsey et al. |
| 6,819,342 | B2 | 11/2004 | Kitagawa et al. |
| 6,826,727 | B1 | 11/2004 | Mohr et al. |
| 6,826,729 | B1 | 11/2004 | Giesen et al. |
| 6,944,830 | B2 | 9/2005 | Card et al. |
| 6,956,737 | B2 | 10/2005 | Chen et al. |
| 6,957,191 | B1 | 10/2005 | Belcsak et al. |
| 7,055,095 | B1 | 5/2006 | Anwar |
| 7,107,525 | B2 | 9/2006 | Purvis |
| 7,178,102 | B1 | 2/2007 | Jones et al. |
| 7,209,815 | B2 | 4/2007 | Grier et al. |
| 7,231,602 | B1 | 6/2007 | Truelove |
| 7,325,186 | B2 | 1/2008 | Jones |
| 7,348,982 | B2 | 3/2008 | Schorr et al. |
| 7,379,074 | B2 | 5/2008 | Gerhard et al. |
| 7,406,660 | B1 | 7/2008 | Sikchi |
| 7,423,646 | B2 | 9/2008 | Saini et al. |
| 7,478,079 | B2 | 1/2009 | Robertson |
| 7,743,325 | B2 | 6/2010 | Berker et al. |
| 7,747,944 | B2 | 6/2010 | Gerhard et al. |
| 7,750,924 | B2 | 7/2010 | Berker |
| 8,134,575 | B2 | 3/2012 | Wong et al. |
| 8,269,790 | B2 | 9/2012 | Wong et al. |
| 8,438,486 | B2 | 5/2013 | Waldman et al. |
| 8,510,657 | B2 | 8/2013 | Gilbert et al. |
| 8,791,955 | B2 | 7/2014 | Schorr et al. |
| 8,799,325 | B2 | 8/2014 | Callens et al. |
| 2001/0035875 | A1 | 11/2001 | Suzuki et al. |
| 2001/0051962 | A1 | 12/2001 | Plotkin |
| 2002/0065852 | A1 | 5/2002 | Hendrickson et al. |
| 2002/0107842 | A1 | 8/2002 | Biebesheimer et al. |
| 2002/0111969 | A1 | 8/2002 | Halstead, Jr. |
| 2003/0065601 | A1 | 4/2003 | Gatto |
| 2003/0069931 | A1 | 4/2003 | Omura |
| 2003/0079177 | A1 | 4/2003 | Brintzenhofe et al. |
| 2003/0126136 | A1 | 7/2003 | Omoigui |
| 2003/0218641 | A1 | 11/2003 | Longobardi |
| 2004/0001106 | A1 | 1/2004 | Deutscher et al. |
| 2004/0021647 | A1 | 2/2004 | Iwema et al. |
| 2004/0041838 | A1 | 3/2004 | Adusumilli et al. |
| 2004/0111672 | A1 | 6/2004 | Bowman et al. |
| 2004/0133854 | A1 | 7/2004 | Black |
| 2004/0145603 | A1 | 7/2004 | Soares |
| 2004/0148571 | A1 | 7/2004 | Lue |
| 2004/0205602 | A1 | 10/2004 | Croeni |
| 2005/0001837 | A1 | 1/2005 | Shannon |
| 2005/0007382 | A1 | 1/2005 | Schowtka et al. |
| 2005/0034083 | A1 | 2/2005 | Jaeger |
| 2005/0091584 | A1 | 4/2005 | Bogdan et al. |
| 2005/0094206 | A1 | 5/2005 | Tonisson |
| 2005/0094207 | A1 | 5/2005 | Lo et al. |
| 2005/0132283 | A1 | 6/2005 | Diwan et al. |
| 2005/0157926 | A1 | 7/2005 | Moravec et al. |
| 2005/0216832 | A1 | 9/2005 | Giannetti |
| 2005/0240858 | A1 | 10/2005 | Croft et al. |
| 2005/0273730 | A1 | 12/2005 | Card et al. |
| 2005/0289466 | A1 | 12/2005 | Chen |
| 2006/0064642 | A1 | 3/2006 | Iyer |
| 2006/0066627 | A1 | 3/2006 | Gerhard et al. |
| 2006/0066631 | A1 | 3/2006 | Schorr et al. |
| 2006/0066632 | A1 | 3/2006 | Wong |
| 2006/0070005 | A1 | 3/2006 | Gilbert |
| 2006/0209093 | A1 | 9/2006 | Berker et al. |
| 2006/0212801 | A1 | 9/2006 | Berker et al. |
| 2006/0277476 | A1 | 12/2006 | Lai |
| 2006/0294460 | A1 | 12/2006 | Chao et al. |
| 2007/0006073 | A1 | 1/2007 | Gerhard et al. |
| 2007/0055939 | A1 | 3/2007 | Furlong et al. |
| 2007/0112832 | A1 | 5/2007 | Wong |
| 2007/0186168 | A1 | 8/2007 | Waldman et al. |
| 2008/0046803 | A1 | 2/2008 | Beauchamp et al. |
| 2008/0136822 | A1 | 6/2008 | Schorr et al. |
| 2008/0178107 | A1 | 7/2008 | Lee et al. |
| 2008/0282147 | A1 | 11/2008 | Schorr |
| 2008/0288916 | A1 | 11/2008 | Tazoe |
| 2009/0019453 | A1 | 1/2009 | Kodaganur |
| 2009/0119577 | A1 | 5/2009 | Almbladh |
| 2009/0327954 | A1 | 12/2009 | Danton |
| 2011/0055687 | A1 | 3/2011 | Bhandar et al. |
| 2011/0225548 | A1 | 9/2011 | Callens et al. |
| 2012/0127178 | A1 | 5/2012 | Wong et al. |
| 2013/0024791 | A1 | 1/2013 | Wong et al. |
| 2013/0232410 | A1 | 9/2013 | Waldman et al. |
| 2013/0290839 | A1 | 10/2013 | Gilbert et al. |
| 2014/0289613 | A1 | 9/2014 | Callens et al. |
| 2016/0371868 | A1 | 12/2016 | Gilbert et al. |
| 2017/0060827 | A1 | 3/2017 | Waldman et al. |
| 2017/0193683 | A1 | 7/2017 | Wong et al. |

FOREIGN PATENT DOCUMENTS

| | | |
|---|---|---|
| EP | 1 111 543 A2 | 6/2001 |
| EP | 1 111 543 A3 | 11/2002 |
| EP | 1643450 | 5/2012 |
| JP | 04-130585 A | 5/1992 |
| JP | 06-309128 | 11/1994 |
| JP | H09-109351 | 4/1997 |
| JP | 2001-500294 | 1/2001 |

(56) References Cited

FOREIGN PATENT DOCUMENTS

| JP | 2002507289 A | 3/2002 |
|---|---|---|
| JP | 2002507301 A | 3/2002 |
| JP | 2003-052582 | 2/2003 |
| JP | 2003044464 A | 2/2003 |
| JP | 2004-220561 | 8/2004 |
| JP | 2005-275890 | 12/2005 |
| JP | 2006-506713 A | 2/2006 |
| KR | 10-1999-0029911 A | 4/1999 |
| KR | 10-1999-0034152 A | 5/1999 |
| KR | 10-2004-0041979 | 5/2004 |
| KR | 10-2004-0048236 A | 6/2004 |
| KR | 1020040073870 | 8/2004 |
| MX | 277871 | 7/2010 |
| RU | 2127449 | 3/1999 |
| RU | 2142162 | 11/1999 |
| RU | 2218602 C2 | 12/2003 |
| TW | 578067 | 3/2004 |
| TW | 200406734 A | 5/2004 |
| WO | WO 8200726 | 3/1982 |
| WO | WO 95/00916 | 1/1995 |
| WO | WO 9855953 | 10/1998 |
| WO | 9924267 | 5/1999 |
| WO | WO 01/39019 A2 | 11/2000 |
| WO | WO 01/39019 A2 | 5/2001 |
| WO | WO 03/052582 A1 | 6/2003 |
| WO | WO 2004/046972 A1 | 6/2004 |

OTHER PUBLICATIONS

U.S. Appl. No. 13/621,614, Office Action mailed Jun. 26, 2015, 6 pgs.
U.S. Appl. No. 13/855,386, Office Action mailed Jul. 14, 2015, 20 pgs.
"Show Me Microsoft Office Powerpoint 2003" by Steve Johnson, Perspection, Inc., Publisher: Que, Publication Date: Oct. 2, 2003, Print ISBN-10; 0-7897-3009-X, 530 pgs.
U.S. Appl. No. 14/296,023, Office Action mailed Dec. 10, 2015, 13 pgs.
U.S. Appl. No. 13/933,390, Office Action mailed Feb. 2, 2016, 13 pgs.
U.S. Appl. No. 13/621,614, Office Action mailed Jan. 29, 2016, 4 pgs.
U.S. Appl. No. 14/296,023, Amendment and Response filed Mar. 10, 2016, 14 pgs.
U.S. Appl. No. 13/855,386, Office Action mailed Mar. 21, 2016, 12 pgs.
U.S. Appl. No. 13/621,614, Amendment and Response filed Apr. 14, 2016, 9 pgs.
U.S. Appl. No. 13/933,390, Amendment and Response filed May 2, 2016, 20 pgs.
U.S. Appl. No. 13/621,614, Notice of Allowance mailed May 23, 2016, 5 pgs.
U.S Appl. No. 13/933,390, Notice of Allowance mailed Jun. 21, 2016, 7 pgs.
U.S. Appl. No. 14/296,023, Notice of Allowance mailed Jun. 22, 2016, 8 pgs.
U.S. Appl. No. 13/855,386, Amendment and Response filed Jun. 21, 2016, 12 pgs.
U.S. Appl. No. 14/296,023, Amendment and Response filed Aug. 29, 2016, 9 pgs.
U.S. Appl. No. 13/855,386, Notice of Allowance mailed Aug. 12, 2016, 11 pgs.
Wenwen, D. et al., "Hierarchical Topics: Visually Exploring Large Text Collections Using Topic Hierarchies", Dec. 2013, IEEE, vol. 19, No. 12, pp. 2002-2011.
Mighlani, D. et al., "Intelligent Hierarchical Layout Segmentation of Document Images on the Basis of Colour Content", Dec. 1997, IEEE Tencon, pp. 191-194.
"Create Diagrams in Word 2002, Excel 2002, and Powerpoint 2002"; http://office.microsoft.com/en-usassistance/HA-010346141033.aspx.; 2 pages.
"de Mail reader," downloaded Mar. 24, 2009, 2 pages. URL: http://de.openoffice.org/services/ReadMMsg?list=annouce&msg. No translation available, 2 pgs.
"Internet as a Source of Prior Art," downloaded Mar. 16, 2009 from Wikipedia, 3 pages. URL: http//en.wikipedia.org/wiki/Internet_as_a_source_of_prior_art, downloaded Mar. 24, 2009 (in German) 3 pages.
"OpenOffice.org 1.0.3.1 in deutsch veroffentlicht," downloaded Mar. 24, 2009, (in German), 4 pages.
"OpenOffice.org," downloaded Mar. 24, 2009; 19 pages. "OpenOffice.org," downloaded Mar. 24, 2009 (as cited as D8 in the Minutes from Oral Proceedings dated Jun. 8, 2009—in German, no translation available); URL: http://www.ooo-portal.de/modules.pnp?op=modload&name=News&, 19 pgs.
"Exploring the Layouts", 1999 software Publishing Corporation, 2 pgs.
"Proquis Compliance Management & Document Control Solutions"; http://wwws.proquis.com/allclear-text2chart.asp, 1 page.
"Show Me Microsoft® Office Powerpoint® 2003" by Steve Johnson, Perspection, Inc., Publisher: Que, Publication Date: Oct. 2, 2003, Print ISBN-10; 0-7897-3009-X; Print ISBN-13: 978-0-7897-3009-1, 4 pgs.
A. C. Beers et al., "Rendering from Compressed Textures," Proceedings of SIGGRAPH '96, Aug. 1996, 4 pgs.
A. Fournier et al., "Computer Rendering of Stochastic Models," Communications of the ACM, Jun. 1982, vol. 25, No. 6, pp. 371-384.
About assigning columns in data files to custom property fields, Microsoft Office Online. Copyright 2006 Microsoft Corporation. [Last Accessed: Apr. 27, 2006], 1 pg.
About breaking your organization chart across multiple pages, Microsoft Office Online. Copyright 2006 Microsoft Corporation. [Last Accessed: Apr. 27, 2006], 1 pg.
About charts, Microsoft Office Online. Copyright 2006 Microsoft Corporation. [Last Accessed: Apr. 27, 2006], 3 pgs.
About choosing actions and events for organization chart shapes, Microsoft Office Online. Copyright 2006 Microsoft Corporation. [Last Accessed: Apr. 27, 2006], 1 pg.
About choosing data file columns, Microsoft Office Online. Copyright 2006 Microsoft Corporation. [Last Accessed: Apr. 27, 2006], 1 pg.
About combination charts, Microsoft Office Online. Copyright 2006 Microsoft Corporation. [Last Accessed: Apr. 27, 2006], 1 pg.
About defining a new ODBC data source, Microsoft Office Online. Copyright 2006 Microsoft Corporation. [Last Accessed: Apr. 27, 2006], 1 pg.
About importing data, Microsoft Office Online. Copyright 2006 Microsoft Corporation. [Last Accessed: Apr. 27, 2006], 3 pgs.
About mapping fields from your data file to a Gantt chart, Microsoft Office Online. Copyright 2006 Microsoft Corporation. [Last Accessed: Apr. 27, 2006], 1 pg.
About Microsoft Visual Basic .NET code to UML mapping, Microsoft Office Online. Copyright 2006 Microsoft Corporation. [Last Accessed: Apr. 27, 2006], 3 pgs.
About Microsoft Visual C# code to UML mapping, Microsoft Office Online. Copyright 2006 Microsoft Corporation. [Last Accessed: Apr. 27, 2006), 3 pgs.
About Microsoft Visual C++ 7.0 code to UML mapping, Microsoft Office Online. Copyright 2006 Microsoft Corporation. [Last Accessed: Apr. 27, 2006], 3 pgs.
About ODBC data sources and organization charts, Microsoft Office Online. Copyright 2006 Microsoft Corporation. [Last Accessed: Apr. 27, 2006], 1 pg.
About OLAP source data in PivotTable and PivotChart reports, Microsoft Office Online. Copyright 2006 Microsoft Corporation. [Last Accessed: Apr. 27, 2006], 3 pgs.
About Organization Chart Wizard data, Microsoft Office Online. Copyright 2006 Microsoft Corporation. [Last Accessed: Apr. 27, 2006]1 pg.
About PivotTable and PivotChart source data, Microsoft Office Online. Copyright 2006 Microsoft Corporation. [Last Accessed: Apr. 27, 2006], 3 pgs.

(56) References Cited

OTHER PUBLICATIONS

About PivotTable reports, Microsoft Office Online. Copyright 2006 Microsoft Corporation. [Last Accessed: Apr. 27, 2006], 2 pgs.
About reverse engineering code to the UML, Microsoft Office Online. Copyright 2006 Microsoft Corporation. [Last Accessed: Apr. 27, 2006], 1 pg.
About selecting delimiters in a Gantt chart, Microsoft Office Online. Copyright 2006 Microsoft Corporation. [Last Accessed: Apr. 27, 2006], 1 pg.
About using Microsoft Query to retrieve external data, Microsoft Office Online. Copyright 2006 Microsoft Corporation. [Last Accessed: Apr. 27, 2006], 3 pgs.
Add, link, edit, or remove titles in a chart, Microsoft Office Online. Copyright 2006 Microsoft Corporation. [Last Accessed: Apr. 27, 2006], 2 pgs.
Advanced Timeline Options dialog box, Microsoft Office Online. Copyright 2006 Microsoft Corporation. [Last Accessed: Apr. 27, 2006], 1 pg.
Anonymous: "Extract of Online-Help for OpenOffice Impress (Stylist), Ver. 1.1.5, German Version, "online! Apr. 2004, 2 pgs.
Australian Examiner's First Report dated Apr. 21, 2010 cited in Application No. 2005203708, 2 pgs.
Australian Examiner's First Report filed in Application No. 2005202720, dated Apr. 22, 2010; 2 pages.
Australian Examiner's Second Report filed in Application No. 2005202720, dated Aug. 30, 2010; 2 pages.
Australian Notice of Allowance in Application 2005202720 mailed Feb. 20, 2011, 3 pgs.
Australian Notice of Allowance in Application 2005203708 mailed Jun. 23, 2010, 3 pgs.
Australian Notice of Allowance in Application 2005203711 mailed Nov. 9, 2010, 3 pgs.
Australian Office Action in Application 2005203711 mailed Apr. 23, 2010, 2 pgs.
Availabe chart types, Microsoft Office Online. Copyright 2006 Microsoft Corporation. [Last Accessed: Apr. 27, 2006], 7 pgs.
Borland, Russell "Running Microsoft Word 97", 1997, Published by Microsoft Press, Pertinent pp. 60-61.
Bugfix-Release OpenOffice 1.0.3.1, Erschienen (Update), no English translation, Apr. 23, 2003, 1 page.
Canadian Notice of Allowance in Application 2511037, mailed May 29, 2013, 1 page.
Canadian Notice of Allowance in Application 2517409, mailed Sep. 20, 2013, 1 page.
Canadian Office Action in Application 2511037, mailed Nov. 14, 2012, 3 pgs.
Canadian Office Action in Application 2517399, mailed Mar. 22, 2013, 2 pgs.
Canadian Office Action in Application 2517409, mailed Feb. 11, 2013, 6 pgs.
Canadian Office Action in Application 2517409, mailed Sep. 19, 2012, 6 pgs.
CASEX ANNEX, dated Apr. 11, 2010 (cited in email communication from European Examiner on May 12, 20011 in European Application 05105366.8); 1 page.
Change Date and Time Formats dialog box, Microsoft Office Online. Copyright 2006 Microsoft Corporation. [Last Accessed: Apr. 7, 2006], 1 pg.
Change Mapping dialog box, Microsoft Office Online. Copyright 2006 Microsoft Corporation. [Last Accessed: Apr. 27, 2006], 1 pg.
Chart Wizard, Microsoft Office Online. Copyright 2006 Microsoft Corporation. [Last Accessed: Apr. 27, 2006], 4 pgs.
Chinese 1st Office Action in Application 200510088525.6 mailed May 9, 2008, 18 pgs.
Chinese 1st Office Action in Application 200510099124.0 mailed Jun. 20, 2008, 19 pgs.
Chinese 2nd Office Action in Application 200510088525.6 mailed Nov. 7, 2008, 10 pgs.
Chinese 2nd Office Action in Application 200510099124.0 mailed Dec. 26, 2008, 9 pgs.
Chinese 2nd Office Action in Application 201010587370.1, mailed Mar. 12, 2012, 8 pgs.
Chinese 3rd Office Action in Application 200510088525.6 mailed Feb. 27, 2009, 9 pgs.
Chinese 3rd Office Action in Application 200510099124.0 mailed Apr. 17, 2009, 16 pgs.
Chinese 3rd Office Action in Application 201010587370.1, mailed Aug. 8, 2013, 8 pgs.
Chinese Decision on Re-Examination in Application 201010587370.1, mailed Apr. 7, 2013, 2 pgs.
Chinese Final Rejection in Application 201010587370.1, mailed Sep. 5, 2012, 6 pgs.
Chinese First Office Action in Application 201010587370.1, mailed Sep. 8, 2011, 8 pgs.
Chinese Fourth Office Action cited in Application No. 200510099124.0, dated Sep. 4, 2009, 7 pages.
Chinese Notice of Allowance in Application 200510088525.6 mailed Jul. 17, 2009, 4 pgs.
Chinese Notice of Allowance in Application 200510099124.0 mailed Sep. 15, 2010, 4 pgs.
Chinese Notice of Allowance in Application 2006100044984 mailed Jan. 22, 2010, 2 pgs.
Chinese Notice of Allowance in Application No. 200510099652.6, mailed Dec. 26, 2008, 4 pgs.
Chinese Office Action dated Aug. 29, 2008 cited in Application No. 2006100044498.4, 15 pgs.
Chinese Office Action dated Jul. 4, 2008 cited in Application No. 200510099652.6, 9 pgs.
Chinese Patent Office Sixth [sic—Fifth] Office Action cited in Application No. 200510099124.0, dated May 10, 2010, 6 pages.
Chinese Second Office Action dated Feb. 20, 2009 cited in Application No. 2006100044498.4, 19 pgs.
Chinese Third Office Action dated Jun. 19, 2009 cited in Application No. 2006100044498.4, 9 pgs.
Chou-Zukai, "Excel 2002, Windows XP General Edition", pp. 210-225 (2002) (cited in Japanese Patent Application No. 2005-187817, no translation available), in Japanese language, 18 pgs.
Configure Interval dialog box, Microsoft Office Online. Copyright 2006 Microsoft Corporation. [Last Accessed: Apr. 27, 2006], 1 pg.
Configure Milestone dialog box, Microsoft Office Online. Copyright 2006 Microsoft Corporation. [Last Accessed: Apr. 27, 2006], 1 pg.
Configure Timeline dialog box (Time Format tab), Microsoft Office Online. Copyright 2006 Microsoft Corporation. [Last Accessed: Apr. 27, 2006], 1 pg.
Configure Timeline dialog box (Time Period tab), Microsoft Office Online. Copyright 2006 Microsoft Corporation. [Last Accessed: Apr. 27, 2006] 1 pg.
Configure Working Time dialog box, Microsoft Office Online. Copyright 2006 Microsoft Corporation. [Last Accessed: Apr. 27, 2006], 1 pg.
Create a chart from data in a PivotTable report, Microsoft Office Online. Copyright 2006 Microsoft Corporation. [Last Accessed: Apr. 27, 2006], 1 pg.
Create a chart, Microsoft Office Online. Copyright 2006 Microsoft Corporation. [Last Accessed: Apr. 27, 2006], 2 pgs.
Create a Gantt chart in Excel, Microsoft Office Online. Copyright 2006 Microsoft Corporation. [Last Accessed: Apr. 27, 2006], 2 pgs.
Create a PivotChart report, Microsoft Office Online. Copyright 2006 Microsoft Corporation. [Last Accessed: Apr. 27, 2006], 3 pgs.
Create a PivotTable report, Microsoft Office Online. Copyright 2006 Microsoft Corporation. [Last Accessed: Apr. 27, 2006], 2 pgs.
Creating a Bubble chart, Microsoft Office Online. Copyright 2006 Microsoft Corporation. [Last Accessed: Apr. 27, 2006, ]2 pgs.
Creating a Stock chart, Microsoft Office Online. Copyright 2006 Microsoft Corporation. [Last Accessed: Apr. 27, 2006], 2 pgs.
Creating a Surface chart, Microsoft Office Online. Copyright 2006 Microsoft Corporation. [Last Accessed: Apr. 27, 2006], 3 pgs.
Creating Pie of Pie and Bar of Pie charts, Microsoft Office Online. Copyright 2006 Microsoft Corporation. [Last Accessed: Apr. 27, 2006], 3 pgs.

(56) References Cited

OTHER PUBLICATIONS css Zen Garden, "The Beauty in CSS Design", retrieved from Archive.org. <http://web.archive.org/web/20031001180317/http://www.csszengarden.com/>, Oct. 1, 2003. Retrieved Nov. 8, 2009, 3 pgs.
D. J. Heeger et al., "Pyramid-Based Texture Analysis/Synthesis," pp. 1-10.
D. R. Peachey, "Solid Texturing of Complex Surfaces," Computer Graphics, vol. 19, No. 3, Jul. 1985, pp. 279-286.
DeBonet, JS, "Multiresolution Sampling Procedure for Analysis and Synthesis of Texture Images", Learning & Vision Group, Artificial Intelligence Laboratory, Massachusetts Institute of Technology, 8 pgs.
Diagram, Oxford English Dictionary, 2nd Edition (1989), Oxford University Press 1989, downloaded from http://www.oed.com/oed/00063080 (cited in email communication from European Examiner on May 12, 2011 in European Application 05105366.8); 2 pgs.
Diagramm—Wikipedia (in German), downloaded from http://de.wikipedia.org/wiki/Diagramm (cited in email communication from European Examiner on May 12, 2011 in European Application 05105366.8); 10 pgs.
European Brief Communication in Application 06111105.0, mailed Sep. 17, 2012, 10 pgs.
European Communication dated Dec. 17, 2008 cited in Application No. 06111105.0, 8 pgs.
European Communication dated Jul. 10, 2009 cited in Application No. 06111105.0, 6 pgs.
European Decision to Refuse a European Application dated Jun. 12, 2009 in Application No. 05108636.1, 39 pages.
European Decision to Refuse in EP Application 06111105.0, mailed Oct. 5, 2012, 27 pgs.
European E-mail communication from European Examiner cited in EP Application 05105366.8 dated May 12, 2011, 2 pgs.
European Exam Report in EP Application 05105366.8 mailed Apr. 30, 2009, 9 pgs.
European Extended Search Report for EP 05 10 8636.1-2218, Jan. 2, 2006, 7 pgs.
European Minutes from Oral Proceedings, dated Jun. 8, 2009, in EP Application No. 05108636.1, 42 pages.
European Minutes of the Sep. 27, 2012 Oral Proceedings in EP Application 06111105.0, mailed Oct. 5, 2012, 3 pgs.
European Notice of Allowance in Application 05105366.8 mailed Jun. 21, 2011, 6 pgs.
European Official Communication in EP Application 051086361 mailed Jun. 1, 2007, 7 pgs.
European Oral Summons in EP Application 06111105.0, mailed May 15, 2012, 10 pgs.
European Search Report dated Feb. 13, 2006 cited in Application 05108658.5, 7 pgs.
European Search Report for EP 05105366.8, Jan. 2, 2006, 3 pgs.
Example of a reverse-engineered solution: FM Stocks, Microsoft Office Online. Copyright 2006 Microsoft Corporation. [Last Accessed: Apr. 27, 2006], 1 pg.
Export a SharePoint list to a spreadsheet, Microsoft Office Online. Copyright 2006 Microsoft Corporation. [Last Accessed: Apr. 27, 2006], 2 pgs.
Five ways to subtotal values in repeating data, Microsoft Office Online. Copyright 2006 Microsoft Corporation. [Last Accessed: Apr. 27, 2006], 5 pgs.
Gallant, John and Bergevin, Holly, Archive.org archive of "CSS Flyouts—Part One," [online] Jun. 24, 2005 [accessed Nov. 13, 2006], CommunityMX, Retrieved from Internet <URL:http://web.archive.org/web/20050624075147/http://www.communitymx.com/content/article.cfm?page=3&cid=55A69>, 2 pgs.
Gantt Chart Options dialog box (Date tab), Microsoft Office Online. Copyright 2006 Microsoft Corporation. [Last Accessed: Apr. 27, 2006], 1 pg.
Gantt Chart Options dialog box (Format tab), Microsoft Office Online. Copyright 2006 Microsoft Corporation. [Last Accessed: Apr. 27, 2006], 1 pg.

H.G. Schuster, "Deterministic Chaos, An Introduction," Second Revised Edition, pp. 200-207.
Heise Online: "OpenOffice 1.1.5 verfügbar" downloaded Jul. 28, 2010 (as cited as D5 in the Minutes from Oral Proceedings dated Jun. 8, 2009—in German, URL: http://www.heise.de/newsticker/meldung/OpenOffice-1-1-5-verfuegbar-130148.html English translation attached); 2 pages.
Insert Column dialog box, Microsoft Office Online. Copyright 2006 Microsoft Corporation. [Last Accessed: Apr. 27, 2006], 1 pg.
Intelligent User Interfaces: Components of Intelligent Interfaces. http://web.cs.wpl.edu/Research/airgIIntIntlintint-paper-components.html [Last Accessed: Nov. 30, 2005], 4 pgs.
Interactive information visualization. http://prefuse.sourceforge.net/ [Last Accessed: Nov. 30, 2005].
Isayama, K.' "SMI Edicolor 5", MAC Power, vol. 12, No. 4, pp. 134-135, Apr. 1, 2001, 7 pgs.
J. Torborg et al., "Talisman: Commodity Realtime 3D Graphics for the PC," Proceedings of SIGGRAPH 1996, 11 pgs.
J.P. Lewis, "Algorithms for Solid Noise Synthesis," Computer Graphics, vol. 23, No. 3, Jul. 1989, pp. 263-270.
Jan Smith, "Jan's PowerPoint Advanced: Images", pp. 7 and 8. obtained online on Mar. 12, 2008 at: http://web.archive.org/web/2005020822247/http://www.jegsworks.com/Lessons/presentations/advanced/images.htm, 9 pgs.
Japanese Final Notice of Rejection dated Aug. 10, 2011 in Application 2006-064583, 3 pgs.
Japanese Final Notice of Rejection in Application 2011-245199, mailed Sep. 7, 2012, 4 pgs.
Japanese Final Rejection and Translation Summary in Application 2006064583, mailed Dec. 1, 2011, 4 pgs.
Japanese Notice of Allowance in Application 2011-160788, mailed Aug. 21, 2012, 4 pgs.
Japanese Notice of Allowance in Application 2011-245199, mailed Jul. 17, 2013, 4 pgs.
Japanese Notice of Allowance in JP Application 2005-275890, mailed Oct. 5, 2011, 5 pgs.
Japanese Notice of Rejection in Application 2011-245199, mailed Apr. 16, 2012, 3 pgs.
Japanese Office Action dated Apr. 12, 2011 cited in JP Application 2005-253627, 5 pgs.
Japanese Official Notification of patent published in Official Gazette in Application 2005-187817, mailed Dec. 7, 2011, 32 pgs.
Japanese Patent Office Notice of Rejection cited in Application No. 2005187817, dated Nov. 11, 2010; 5 pages.
Japanese Patent Office Notice of Rejection cited in Application No. 2005275890, dated Nov. 18, 2010; 9 pages.
K. Perlin, "An Image Synthesizer," Computer Graphics, vol. 19, No. 3, Jul. 1985, pp. 287-296.
Keyboard shortcuts, Microsoft Office Online. Copyright 2006 Microsoft Corporation. [Last Accessed: Apr. 27, 2006], 17 pgs.
Korean Final Notice of Rejection in Application 10-2005-0057172, mailed Aug. 29, 2012, 6 pgs.
Korean Notice of Final Rejection in Application 10-2005-00738480, mailed Apr. 30, 2012, 6 pgs.
Korean Notice of Preliminary Rejection and Translation Summary in Application 10200573848, mailed Dec. 12, 2011, 6 pgs.
Korean Notice of Preliminary Rejection dated Feb. 23, 2012 cited in Application No. 10-2006-0007338, 6 pgs.
Korean Notice of Preliminary Rejection in Application 1020050073710, mailed Jan. 31, 2012, 1 pg. English translation.
Korean Notice of Preliminary Rejection in Application 10-2005-57172, mailed Jan. 25, 2012, 1 pg. English translation.
Korean Preliminary Rejection (English translation), Application 102006-0007338, mailed Feb. 23, 2012, 2 pgs.
LingCh by Elod Csirmaz—Retrieved Date: Jan. 11, 2010, http://www.postminart.org/csirmaz/lingch.txt., 5 pgs.
Linuxforen.de, "OpenOffice.org 1.0.3.1 in deutsch veröffentlicht," downloaded Mar. 24, 2009 (as cited as D6 in the Minutes from Oral Proceedings dated Jun. 8, 2009—in German, no translation available); 3 pages.
M. Cox et al., "Multi-Level Texture Caching for 3D Graphics Hardware," In Proceedings of the 25th International Symposium on Computer Architecture, 1998, pp. 86-97.

(56) References Cited

OTHER PUBLICATIONS

M. Pharr et al., "Rendering Complex Scenes with Memory-Coherent Ray Tracing," Proceedings of SIGGRAPH 1997, pp. 1-8.
Malaysian Adverse Report in Application PI20054064, mailed Jan. 15, 2013, 2 pgs.
Malaysian Adverse Report in Application PI20054064, mailed Nov. 15, 2011, 3 pgs.
Malaysian Examination Report in Application PI 20054063, mailed Sep. 15, 2011, 3 pgs.
Mexican Office Action dated Dec. 4, 2008 cited in Application No. PA/a/2005/009276 (not in English), 4 pgs.
Mexican Office Action dated May 25, 2009 cited in Application No. PA/a/2005/009276, 10 pgs.
Microsoft Office PowerPoint 2003 11.6564.6568 with Service Pack 2, Part of Microsoft Office Professional Edition 2003, 9 pgs.
Microsoft Office Word 2003 11.6568.6568 with Service Pack 2, Part of Microsoft Office Professional Edition 2003, 7 pgs.
Minoru Sendagi, "Word 2003 Perfect Master, Windows XP Kanzentaiou", pp. 500-507, 2003, 10 pgs.
Modeling exponential growth, Microsoft Office Online. Copyright 2006 Microsoft Corporation. [Last Accessed: Apr. 27, 2006], 2 pgs.
Online Training Solutions, Inc et al., "Microsoft Office PowerPoint 2003 Step by Step", Microsoft Press, Aug. 27, 2003, 105 pgs.
Outline a list of data in a worksheet, Microsoft Office Online. Copyright 2006 Microsoft Corporation. [Last Accessed: Apr. 27, 2006], 14 pgs.
Overview of security and protection in Excel, Microsoft Office Online. Copyright 2006 Microsoft Corporation. [Last Accessed: Apr. 27, 2006], 4 pgs.
P. Hanrahan et al., "A Language for Shading and Lighting Calculations," Computer Graphics, vol. 24, No. 4, Aug. 1990, pp. 289-298.
PivotTable and PivotChart Wizard, Microsoft Office Online. Copyright 2006 Microsoft Corporation. [Last Accessed: Apr. 27, 2006], 3 pgs.
PivotTable reports 101, Microsoft Office Online. Copyright 2006 Microsoft Corporation. [Last Accessed: Apr. 27, 2006], 11 pgs.
PivotTable terminology demystified, Microsoft Office Online. Copyright 2006 Microsoft Corporation. [Last Accessed: Apr. 27, 2006], 4 pgs.
R.L. Cook et al., "The Reyes Image Rendering Architecture," Computer Graphics, vol. 21, No. 4, Jul. 1987, pp. 95-102.
Reverse engineer Visual Studio .NET source code, Microsoft Office Online. Copyright 2006 Microsoft Corporation. [Last Accessed: Apr. 27, 2006], 1 pg.
Reverse engineered code in the Model Explorer tree view, Microsoft Office Online. Copyright 2006 Microsoft Corporation. [Last Accessed: Apr. 27, 2006], 2 pgs.
Roth, et al. "SageTools: An Intelligent Environment for Sketching, Browsing, and Customizing Data-Graphics". School of Computer Science. Carnegie Mellon University. Proceedings CHI'95 Human Factors in Computing Systems, ACM, May 1995, 2 pgs.
Russian Notice of Allowance in Application 2005130349 mailed Oct. 30, 2009, 7 pgs.
Russian Notice of Allowance in Application 2005130361 mailed Oct. 7, 2009, 16 pgs.
Russian Notice of Allowance in RU application 2005120365 mailed Oct. 6, 2009, 4 pgs.
Screen Shots (Examiner generated) taken on Mar. 18, 2010 of Microsoft PowerPoint 2002, publicly released Mar. 5, 2001); cited in U.S. Appl. No. 11/013,655, 6 pgs.
Screen shots of Microsoft PowerPoint, 2002, (U.S. Appl. No. 11/013,655 on Jan. 9, 2009), 15 pgs.
Screen shots of Microsoft PowerPoint, 2002, taken at Oct. 9, 2010, 6 pgs.
Show or hide a chart legend or data table, Microsoft Office Online. Copyright 2006 Microsoft Corporation. [Last Accessed: Apr. 27, 2006], 2 pgs.
Singleton, Roderick, "OpenOffice.org User Guide for Version 1.1.X", May 7, 2004, Online, XP002348571; retrieved from the Internet: URL:www.openoffice.org>, retrieved Sep. 30, 2005; pp. 253-284.
Statistica, StatSoft User Interface, http://www.statsoft.com/uniquefeatureslinterface.html (Last Accessed: Nov. 30, 2005), 6 pgs.
Styling Nested Lists, [online] Oct. 19, 2003 [accessed Nov. 13, 2006], SimpleBits, LLC, Retrieved from Internet<URL:http://www.simplebits.com/notebook/2003/10/19/styling_nested_lists.html./> pp. 1-5.
Synchronize Interval dialog box, Microsoft Office Online. Copyright 2006 Microsoft Corporation. [Last Accessed: Apr. 27, 2006], 1 pg.
Synchronize Milestone dialog box, Microsoft Office Online. Copyright 2006 Microsoft Corporation. [Last Accessed: Apr. 27, 2006], 1 pg.
Tony Apodoca, "Using RenderMan in Animation Production," SIGGRAPH 1995, Course 4, Monday Aug. 7, 1995, 41 pgs.
Taiwan Notice of Allowance in Application 94126264, mailed Jun. 10, 2013, 4 pgs.
Taiwan Notice of Allowance in Application 94127756, mailed Aug. 23, 2012, 4 pgs.
Taiwan Search Report in Application 094127756, mailed Jan. 3, 2012, 1 pg.
The University of Alberta, "PowerPoint Basics", pp. 1 and 7. obtained online on Mar. 6, 2008 at: http://web.archive.org/web/20050207083815/http://www.quasar.ualberta.ca/edpy202/tutorial/PowerPointIpptBasics/pptBasics.htm, 17 pgs.
"Top tips for Excel: Charts and graphics", Microsoft Office Online. Copyright 2006 Microsoft Corporation. [Last Accessed: Apr. 27, 2006], 2 pgs.
Troubleshoot charts, Microsoft Office Online. Copyright 2006 Microsoft Corporation. [Last Accessed: Apr. 27, 2006], 11 pgs.
"Troubleshoot OLAP cubes", Microsoft Office Online. Copyright 2006 Microsoft Corporation. [Last Accessed: Apr. 27, 2006], 3 pgs.
Troubleshoot PivotChart reports, Microsoft Office Online. Copyright 2006 Microsoft Corporation. [Last Accessed: Apr. 27, 2006], 7 pgs.
"Troubleshoot PivotTable reports", Microsoft Office Online. Copyright 2006 Microsoft Corporation. [Last Accessed: Apr. 27, 2006], 7 pgs.
U.S. Appl. No. 09/578,574, Office Action mailed Oct. 23, 2001, 16 pgs.
U.S. Appl. No. 10/955,271, Advisory Action mailed Jan. 9, 2007, 3 pgs.
U.S. Appl. No. 10/957,103, Advisory Action mailed Jan. 17, 2008, 3 pgs.
U.S. Appl. No. 10/957,103, Amendment and Response filed Jan. 23, 2008, 19 pgs.
U.S. Appl. No. 10/957,103, Amendment and Response filed Nov. 18, 2009, 28 pgs.
U.S. Appl. No. 10/957,103, Amendment and Response filed Nov. 23, 2010, 23 pgs.
U.S. Appl. No. 10/957,103, Amendment and Response filed Dec. 12, 2008, 17 pgs.
U.S. Appl. No. 10/957,103, Amendment and Response filed Dec. 14, 2012, 14 pgs.
U.S. Appl. No. 10/957,103, Amendment and Response filed Dec. 26, 2007, 18 pgs.
U.S. Appl. No. 10/957,103, Amendment and Response filed Mar. 22, 2013, 16 pgs.
U.S. Appl. No. 10/957,103, Amendment and Response filed Apr. 14, 2009, 24 pgs.
U.S. Appl. No. 10/957,103, Amendment and Response filed May 3, 2013, 3 pgs.
U.S. Appl. No. 10/957,103, Amendment and Response filed Jun. 15, 2010, 24 pgs.
U.S. Appl. No. 10/957,103, Amendment and Response filed Jun. 17, 2008, 16 pgs.
U.S. Appl. No. 10/957,103, Amendment and Response filed Jun. 22, 2012, 28 pgs.

(56) References Cited

OTHER PUBLICATIONS

U.S. Appl. No. 10/957,103, Amendment and Response filed Jul. 8, 2011, 21 pgs.
U.S. Appl. No. 10/957,103, Amendment and Response filed Aug. 16, 2007, 17 pgs.
U.S. Appl. No. 10/957,103, Amendment filed Jan. 27, 2012, 26 pgs.
U.S. Appl. No. 10/957,103, Final Office Action mailed Sep. 27, 2011, 19 pgs.
U.S. Appl. No. 10/957,103, Notice of Allowance mailed Oct. 5, 2012, 5 pgs.
U.S. Appl. No. 10/957,103, Notice of Allowance mailed Apr. 11, 2013, 7 pgs.
U.S. Appl. No. 10/957,103, Office Action mailed Jan. 3, 2013, 7 pgs.
U.S. Appl. No. 10/957,103, Office Action mailed Feb. 22, 2012, 19 pgs.
U.S. Appl. No. 10/957,103, Office Action mailed Apr. 13, 2011, 19 pgs.
U.S. Appl. No. 11/013,630, Office Action mailed Jan. 22, 2008, 2 pgs.
U.S. Appl. No. 11/013,630, Petition dated Mar. 17, 2008, 2 pgs.
U.S. Appl. No. 11/013,630, Petition Decision dated Mar. 18, 2008, 1 page.
U.S. Appl. No. 11/013,630, Petition Decision dated Jul. 21, 2008, 1 page.
U.S. Appl. No. 11/013,655, Amendment and Response filed Jan. 24, 2011, 16 pgs.
U.S. Appl. No. 11/013,655, Amendment and Response filed Oct. 14, 2008, 14 pgs.
U.S. Appl. No. 11/013,655, Amendment and Response filed Nov. 18, 2009, 15 pgs.
U.S. Appl. No. 11/013,655, Amendment and Response filed May 11, 2009, 17 pgs.
U.S. Appl. No. 11/013,655, Amendment and Response filed Aug. 11, 2008, 13 pgs.
U.S. Appl. No. 11/013,655, Amendment and Response filed Aug. 24, 2010, 21 pgs.
U.S. Appl. No. 11/013,655, Notice of Allowance mailed Jan. 7, 2011, 5 pgs.
U.S. Appl. No. 11/013,655, Office Action mailed Oct. 25, 2010, 15 pgs.
U.S. Appl. No. 11/081,323, Advisory Action mailed Sep. 18, 2007, 3 pgs.
U.S. Appl. No. 11/081,324, Examiner's Amendment Communication mailed Aug. 12, 2009, 2 pgs.
U.S. Appl. No. 11/081,324, Examiner's Amendment Communication mailed Aug. 4, 2009, 2 pgs.
U.S. Appl. No. 11/081,324, Examiner's Amendment Communication mailed Sep. 11, 2009, 2 pgs.
U.S. Appl. No. 11/081,324, Petition dated Oct. 5, 2009, 1 page.
U.S. Appl. No. 11/351,341, Amendment and Response filed Oct. 19, 2009, 14 pgs.
U.S. Appl. No. 11/351,341, Amendment and Response filed Dec. 12, 2012, 9 pgs.
U.S. Appl. No. 11/351,341, Amendment and Response filed Mar. 2, 2011, 11 pgs.
U.S. Appl. No. 11/351,341, Amendment and Response filed Apr. 14, 2009, 18 pgs.
U.S. Appl. No. 11/351,341, Amendment and Response filed Jul. 2, 2012, 21 pgs.
U.S. Appl. No. 11/351,341, Amendment and Response filed Jul. 7, 2010, 17 pgs.
U.S. Appl. No. 11/351,341, Amendment and Response filed Sep. 12, 2011, 16 pgs.
U.S. Appl. No. 11/351,341, Notice of Allowance mailed Jan. 2, 2013, 22 pgs.
U.S. Appl. No. 11/351,341, Notice of Allowance mailed Oct. 22, 2012, 21 pgs.
U.S. Appl. No. 11/351,341, Office Action mailed Jan. 7, 2010, 32 pgs.
U.S. Appl. No. 11/351,341, Office Action mailed Feb. 3, 2012, 34 pgs.
U.S. Appl. No. 11/351,341, Office Action mailed Mar. 20, 2008, 18 pgs.
U.S. Appl. No. 11/351,341, Office Action mailed May 12, 2011, 25 pgs.
U.S. Appl. No. 11/351,341, Office Action mailed Aug. 7, 2009, 24 pgs.
U.S. Appl. No. 11/351,341, Office Action mailed Sep. 2, 2010, 32 pgs.
U.S. Appl. No. 12/035,878, Amendment and Response filed Jan. 28, 2011, 14 pgs.
U.S. Appl. No. 12/035,878, Amendment and Response filed Nov. 28, 2011, 15 pgs.
U.S. Appl. No. 12/035,878, Amendment and Response filed Feb. 21, 2013, 14 pgs.
U.S. Appl. No. 12/035,878, Amendment and Response filed Apr. 26, 2012, 14 pgs.
U.S. Appl. No. 12/035,878, Amendment and Response filed Jul. 14, 2011, 14 pgs.
U.S. Appl. No. 12/035,878, Amendment and Response filed Aug. 21, 2012, 15 pgs.
U.S. Appl. No. 12/035,878, Amendment and Response filed Sep. 5, 2013, 14 pgs.
U.S. Appl. No. 12/035,878, Final Office Action mailed Nov. 26, 2012, 32 pgs.
U.S. Appl. No. 12/035,878, Final Office Action mailed Apr. 14, 2011, 28 pgs.
U.S. Appl. No. 12/035,878, Office Action mailed Jan. 27, 2012, 27 pgs.
U.S. Appl. No. 12/035,878, Office Action mailed Oct. 28, 2010, 30 pgs.
U.S. Appl. No. 12/035,878, Office Action mailed Nov. 8, 2013, 35 pgs.
U.S. Appl. No. 12/035,878, Office Action mailed May 15, 2012, 37 pgs.
U.S. Appl. No. 12/035,878, Office Action mailed May 28, 2013, 31 pgs.
U.S. Appl. No. 12/035,878, Office Action mailed Aug. 26, 2011, 27 pgs.
U.S. Appl. No. 12/723,127, Amendment and Response filed Nov. 6, 2012, 14 pgs.
U.S. Appl. No. 12/723,127, Amendment and Response filed Jun. 26, 2012, 17 pgs.
U.S. Appl. No. 12/723,127, Notice of Allowance mailed Dec. 17, 2013, 11 pgs.
U.S. Appl. No. 12/723,127, Notice of Allowance mailed Aug. 8, 2013, 9 pgs.
U.S. Appl. No. 12/723,127, Office Action mailed Feb. 27, 2012, 19 pgs.
U.S. Appl. No. 12/723,127, Office Action mailed Aug. 6, 2012, 23 pgs.
U.S. Appl. No. 13/362,879, Notice of Allowance mailed May 14, 2012, 5 pgs.
U.S. Appl. No. 10/955,271, Office Action dated Apr. 17, 2007, 16 pgs.
U.S. Appl. No. 10/955,271, Amendment and Response filed Jan. 16, 2007, 12 pgs.
U.S. Appl. No. 10/955,271, Amendment and Response filed Dec. 4, 2006, 14 pgs.
U.S. Appl. No. 10/955,271, Amendment and Response filed Jul. 24, 2006, 13 pgs.
U.S. Appl. No. 10/955,271, Amendment and Response filed Jul. 31, 2007, 16 pgs.
U.S. Appl. No. 10/955,271, Notice of Allowance mailed Oct. 12, 2007, 7 pgs.
U.S. Appl. No. 10/955,271, Notice of Allowance mailed Dec. 14, 2007, 12 pgs.
U.S. Appl. No. 10/955,271, Office Action dated Apr. 20, 2006, 10 pgs.
U.S. Appl. No. 10/955,271, Office Action dated Oct. 3, 2006, 12 pgs.

(56) References Cited

OTHER PUBLICATIONS

U.S. Appl. No. 10/957,103, Office Action dated Feb. 18, 2010, 18 pgs.
U.S. Appl. No. 10/957,103, Office Action dated Jul. 21, 2009, 24 pgs.
U.S. Appl. No. 10/957,103, Final Office Action dated Aug. 31, 2010, 19 pages.
U.S. Appl. No. 10/957,103, Office Action dated Jan. 14, 2009, 22 pgs.
U.S. Appl. No. 10/957,103, Office Action dated Mar. 19, 2008, 20 pgs.
U.S. Appl. No. 10/957,103, Office Action dated May 16, 2007, 16 pgs.
U.S. Appl. No. 10/957,103, Office Action dated Oct. 23, 2007, 25 pgs.
U.S. Appl. No. 10/957,103, Office Action dated Sep. 12, 2008, 25 pgs.
U.S. Appl. No. 11/013,630, Amendment and Response filed Jan. 31, 2007, 13 pgs.
U.S. Appl. No. 11/013,630, Notice of Allowance mailed Mar. 16, 2007, 7 pgs.
U.S. Appl. No. 11/013,630, Notice of Allowance mailed Jul. 26, 2007, 4 pgs.
U.S. Appl. No. 11/013,630, Office Action dated Oct. 31, 2006, 10 pgs.
U.S. Appl. No. 11/013,655, Notice of Allowance mailed Jan. 17, 2012, 5 pgs.
U.S. Appl. No. 11/013,655, Notice of Allowance mailed Jan. 30, 2012, 2 pgs.
U.S. Appl. No. 11/013,655, Office Action dated Apr. 9, 2008, 18 pgs.
U.S. Appl. No. 11/013,655, Office Action dated Aug. 19, 2009, 20 pgs.
U.S. Appl. No. 11/013,655, Office Action dated Jan. 9, 2009, 16 pgs.
U.S. Appl. No. 11/013,655, Office Action dated May 25, 2010, 31 pgs.
U.S. Appl. No. 11/081,323, Advisory Action mailed Oct. 31, 2008, 3 pgs.
U.S. Appl. No. 11/081,323, Amendment and Response filed Oct. 29, 2007, 11 pgs.
U.S. Appl. No. 11/081,323, Amendment and Response filed Apr. 20, 2007, 14 pgs.
U.S. Appl. No. 11/081,323, Amendment and Response filed Apr. 23, 2008, 11 pgs.
U.S. Appl. No. 11/081,323, Amendment and Response filed May 18, 2009, 13 pgs.
U.S. Appl. No. 11/081,323, Amendment and Response filed Sep. 18, 2008, 13 pgs.
U.S. Appl. No. 11/081,323, Amendment and Response filed Sep. 6, 2007, 12 pgs.
U.S. Appl. No. 11/081,323, Notice of Allowance mailed Dec. 1, 2009, 4 pgs.
U.S. Appl. No. 11/081,323, Notice of Allowance mailed Dec. 16, 2009, 4 pgs.
U.S. Appl. No. 11/081,323, Notice of Allowance mailed Feb. 23, 2010, 4 pgs.
U.S. Appl. No. 11/081,323, Notice of Allowance mailed Aug. 13, 2009, 6 pgs.
U.S. Appl. No. 11/081,323, Notice of Allowance mailed Sep. 18, 2009, 2 pgs.
U.S. Appl. No. 11/081,323, Office Action date Jan. 23, 2008, 9 pgs.
U.S. Appl. No. 11/081,323, Office Action dated Feb. 18, 2009, 12 pgs.
U.S. Appl. No. 11/081,323, Office Action dated Jan. 22, 2007, 10 pgs.
U.S. Appl. No. 11/081,323, Office Action dated Jul. 18, 2008, 13 pgs.
U.S. Appl. No. 11/081,323, Office Action dated Jul. 6, 2007, 11 pgs.
U.S. Appl. No. 11/081,324, Advisory Action mailed Jan. 29, 2009, 3 pgs.
U.S. Appl. No. 11/081,324, Advisory Action mailed Feb. 29, 2008, 3 pgs.
U.S. Appl. No. 11/081,324, Amendment and Response mailed Jan. 26, 2009, 17 pgs.
U.S. Appl. No. 11/081,324, Amendment and Response mailed Feb. 11, 2008, 15 pgs.
U.S. Appl. No. 11/081,324, Amendment and Response mailed Sep. 12, 2008, 15 pgs.
U.S. Appl. No. 11/081,324, Amendment and Response mailed Sep. 28, 2007, 16 pgs.
U.S. Appl. No. 11/081,324, Notice of Allowance mailed Nov. 30, 2009, 6 pgs.
U.S. Appl. No. 11/081,324, Notice of Allowance mailed Mar. 5, 2010, 6 pgs.
U.S. Appl. No. 11/081,324, Notice of Allowance mailed Jun. 10, 2009, 12 pgs.
U.S. Appl. No. 11/081,324, Office Action dated Dec. 11, 2007, 15 pgs.
U.S. Appl. No. 11/081,324, Office Action dated Jun. 29, 2007, 16 pgs.
U.S. Appl. No. 11/081,324, Office Action dated May 12, 2008, 15 pgs.
U.S. Appl. No. 11/081,324, Office Action dated Nov. 26, 2008, 18 pgs.
U.S. Appl. No. 11/172,279, Advisory Action mailed Oct. 24, 2008, 3 pgs.
U.S. Appl. No. 11/172,279, Advisory Action mailed Aug. 23, 2007, 3 pgs.
U.S. Appl. No. 11/172,279, Amendment and Response mailed Jan. 11, 2010, 21 pgs.
U.S. Appl. No. 11/172,279, Amendment and Response mailed Oct. 16, 2008, 14 pgs.
U.S. Appl. No. 11/172,279, Amendment and Response mailed Nov. 19, 2007, 9 pgs.
U.S. Appl. No. 11/172,279, Amendment and Response mailed Feb. 18, 2009, 14 pgs.
U.S. Appl. No. 11/172,279, Amendment and Response mailed Feb. 27, 2007, 12 pgs.
U.S. Appl. No. 11/172,279, Amendment and Response mailed Jun. 6, 2008, 11 pgs.
U.S. Appl. No. 11/172,279, Amendment and Response mailed Jul. 28, 2009, 21 pgs.
U.S. Appl. No. 11/172,279, Amendment and Response mailed Aug. 17, 2007, 9 pgs.
U.S. Appl. No. 11/172,279, Final Office Action dated Aug. 19, 2008, 11 pgs.
U.S. Appl. No. 11/172,279, Final Office Action dated May 17, 2007, 13 pgs.
U.S. Appl. No. 11/172,279, Notice of Allowance mailed Apr. 2, 2010, 8 pgs.
U.S. Appl. No. 11/172,279, Office Action dated Apr. 29, 2009, 13 pgs.
U.S. Appl. No. 11/172,279, Office Action dated Mar. 6, 2008, 11 pgs.
U.S. Appl. No. 11/172,279, Office Action dated Nov. 12, 2009, 19 pgs.
U.S. Appl. No. 11/172,279, Office Action dated Nov. 27, 2006, 11 pgs.
Using charts and diagrams in the classroom, Microsoft Office Online. Copyright 2006 Microsoft Corporation. [Last Accessed: Apr. 27, 2006], 5 pgs.
Using Excel 2003 with earlier versions of Excel, Microsoft Office Online. Copyright 2006 Microsoft Corporation. [Last Accessed: Apr. 27, 2006], 4 pgs.
V.I. Arnold et al., "Ergodic Problems of Classical Mechanics," W.A. Benjamin, Inc., pp. v-ix & pp. 1-51.
Visio 2003 Bible, Chapter 10 (pp. 187-202), Chapter 12 (pp. 223-238), Chapter 13 (pp. 239-252) and Chapter 14 (pp. 253-270), copyright 2004 by Wiley Publishing Company (cited in email communication from European Examiner on May 12, 2011 in European Application 05105366.8); 69 pgs.
Where is the Chart menu?, Microsoft Office Online. Copyright 2006 Microsoft Corporation. [Last Accessed: Apr. 27, 2006], 1 pg.

(56) References Cited

OTHER PUBLICATIONS

Word Windows XP 2003, Microsoft Office 2003 Edition, no English translation, 10 pgs.
Work with Visio UML model diagrams in Visual Studio .NET', Microsoft Office Online. Copyright 2006 Microsoft Corporation. [Last Accessed: Apr. 27, 2006), 1 pg.
Y. Xu et al., "Chaos-Based Texture Synthesis," Visual Computing Group, Microsoft Research China, pp. 1-9.
yEd Graph Editor—Published Date: 2009; New yEd version 3.4.1, http://www.yworks.com/en/products_yed_about.html, 5 pgs.
Young, Michael J., "Microsoft Office System Inside Out"—2003 Edition, Michael Halvorson, 2003, p. 267.
Canadian Examiner's Report in Application 2517399, mailed Nov. 29, 2013, 4 pgs.
Malaysian Notice of Allowance in Application PI 20054064, mailed Oct. 31, 2013, 2 pgs.
Eunsoon Choi, "A Study on Instruction for Statistics & Probability through Excel Utilization" published on Aug. 2002 as a master's thesis submitted to the graduate school of education, no English translation available, Silla University, Korea, 75 pgs.
Korean Notice of Preliminary Rejection in Application (with English translation), in Application 10-2005-73848, mailed Nov. 18, 2013, 8 pgs.
Malaysian Notice of Allowance in Application PI 20054063, mailed Jul. 15, 2013, 2 pgs.
U.S. Appl. No. 12/035,878, Amendment and Response filed Feb. 10, 2014, 15 pgs.
U.S. Appl. No. 12/035,878, Notice of Allowance mailed Mar. 14, 2014, 10 pgs.
U.S. Appl. No. 12/723,127, Notice of Allowance mailed Feb. 28, 2014, 8 pgs.
Chinese Notice of Allowance in Application 201010587370.1, mailed Feb. 13, 2014, 4 pgs.
Russian Notice of Allowance in Application 2010100807, received Jan. 31, 2014, 6 pgs.
U.S. Appl. No. 12/035,878, Amendment filed Apr. 22, 2014, 3 pgs.
U.S. Appl. No. 12/723,127, Amendment filed Apr. 22, 2014, 1 pg.
Canadian Notice of Allowance in Application 2517399, mailed Sep. 5, 2014, 2 pgs.
U.S. Appl. No. 13/621,614, Amendment and Response filed Sep. 28, 2015, 9 pgs.
U.S. Appl. No. 13/855,386, Amendment and Response filed Oct. 14, 2015, 12 pgs.
European Office Action Issued in Patent Application No. 05108658.5, Mailed Date: Nov. 8, 2006, 7 Pages.
U.S. Appl. No. 09/482,285, Office Action mailed Mar. 14, 2002, 10 Pages.
Mexican Patent Office Action cited in Application No. PA/a/2005/009276, mailed May 3, 2010, 11 pages (with Eng. Trans).
Japanese Office Action Issued in Patent Application No. 2005-253627, Mailed Date: Dec. 1, 2010, 6 Pages (with English translation).
Japanese Notice of Rejection Issued in Patent Application No. 2006-064583, Mailed Date: Apr. 20, 2011, 3 Pages (with Eng. Trans).
U.S. Appl. No. 13/933,390, Amendment after Allowance filed Aug. 4, 2016, 7 pgs.
U.S. Appl. No. 13/933,390, USPTO Response to Amendment mailed Aug. 16, 2016, 2 pgs.
U.S. Appl. No. 13/933,390, Amendment after Allowance filed Aug. 26, 2016, 11 pgs.
U.S. Appl. No. 14/296,023, USPTO Response mailed Sep. 9, 2016, 2 pgs.
U.S. Appl. No. 13/621,614, Amendment after Allowance filed Aug. 4, 2016, 9 pgs.
U.S. Appl. No. 13/621,614, USPTO Response mailed Sep. 2, 2016, 2 pgs.
U.S. Appl. No. 13/855,386, USPTO Response mailed Sep. 9, 2016, 2 pgs.
U.S. Appl. No. 13/855,386, Notice of Allowance mailed Sep. 22, 2016, 2 pgs.
U.S. Appl. No. 13/621,614, Notice of Allowance mailed Dec. 9, 2016, 5 pgs.
Brazil Office Action in Application PI0502558-3, mailed Jan. 26, 2017, 7 pgs.
U.S. Appl. No. 13/621,614, Amendment after Allowance filed Jan. 10, 2017, 9 pgs.
U.S. Appl. No. 13/621,614, USPTO Response mailed Jan. 20, 2017, 2 pgs.
U.S. Appl. No. 13/855,386, 312 Amendment filed Aug. 26, 2016, 3 pages.
Indian Office Action in Application 2126/DEL/2005, mailed Jan. 25, 2017, 9 pgs.
Indian Office Action in Application 1572/DEL/2005, dated May 31, 2017, 8 pgs.
Brazilian Office Action in Application PI0503878-2, dated May 29, 2017, 14 pages.
Indian Office Action in Application 0343/DEL/2006, dated May 31, 2017, 11 pages.

```
<LayoutNode>
    <Algorithm type="pyramid" />
    <Shapes>
        <Shape ID="trapezoid" />
    </Shapes>
    <Constraints>
        <Constraint type="width" value="1" />
    </Constraints>
    <ForEach axis="children">
        <Algorithm type="bulleted - list" />
        <Constraints>
            <Constraint type="height" value="2" />
        </Constraints>
    </ForEach>
</LayoutNode>
```

METHOD, SYSTEM, AND COMPUTER-READABLE MEDIUM FOR CREATING AND LAYING OUT A GRAPHIC WITHIN AN APPLICATION PROGRAM

CROSS-REFERENCE TO RELATED APPLICATIONS

This patent application is a continuation of U.S. patent application Ser. No. 12/035,878 (now U.S. Pat. No. 8,791,955), entitled "Method, System, and Computer-Readable Medium for Creating and Laying Out a Graphic Within an Application Program," filed Feb. 22, 2008, which application is a continuation of U.S. patent application Ser. No. 10/955,271 (now U.S. Pat. No. 7,348,982), entitled "Method, System and Computer-Readable Medium for Creating and Laying Out a Graphic within an Application program," filed on Sep. 30, 2004. The aforementioned patent applications are expressly incorporated in their entirety herein by reference.

BACKGROUND OF THE INVENTION

Modern software applications, including word processors and dedicated drawing application programs, enable users to create both simple and complex graphics. These drawing programs allow users to create graphics using a variety of shapes which may be annotated with text. The graphics created by these applications may be stand-alone documents or incorporated into text documents. Despite the advantages offered by modern drawing programs, however, these programs suffer from several drawbacks which hinder the creation and layout of graphics by the typical user.

One drawback of modern drawing programs is that although they may offer tools for creating graphics, many users are not aware of these existing tools, or of how to use them effectively. As a result, users either create their own graphics or use the graphics tools incorrectly, resulting in graphics with shapes that are misaligned and text that should be the same font size, but is not. Another drawback of modern drawing programs is that shapes containing text do not automatically resize fonts or expand their dimensions for added or enlarged text such that the text remains fully enclosed in the shape. Yet another drawback of modern drawing programs is that they offer either rigid layouts or no layout at all. Programs with no layout require users to manually size and position every shape; programs with rigid layout do not allow users to make any changes or customizations to the size or position of the shape.

It is with respect to these considerations and others that the various embodiments of the present invention have been made.

BRIEF SUMMARY OF THE INVENTION

In accordance with the present invention, the above and other problems are solved by a method, apparatus, and computer-readable medium for creating and laying out a graphic within a drawing application program based on a set of constraints that transform data and relationships into a specific graphic layout. The method includes receiving a data model defining the data and relationships between that data that will be represented in the graphic, receiving a graphic definition defining the graphic to be created, generating a layout tree by mapping data from the data model to the information in the graphic definition, determining the size and position for the graphic shapes according to the constraint values and constraint rules specified in the graphic definition, and creating a shape list for the graphic using the information from the layout tree. These shapes can then be rendered by any rendering application to achieve a final graphic.

To map the data from the data model to the information in the graphic definition, the method iterates through the data model and applies criteria specified in the graphic definition to determine the algorithms, constraints, constraint rules, and shape properties for each shape needed to construct the graphic. These sets of data are then added to the layout tree, which is a hierarchical representation of the graphic structure.

To determine the size and position of graphic shapes, the method accesses the algorithms, constraints, and constraint rules in the graphic definition. The algorithms come from an unbounded set of potential algorithms that know how to size and position shapes to achieve a specific graphic layout, such as laying out shapes in a circular path or laying out shapes in a linear path. The algorithms use the constraints, or starting values, along with the constraint rules, or instructions for altering those starting values within a range, to determine the size and position of the shapes, based on the number of shapes, amount of text within each shape, and the dimensions of the area in which the shapes are to be laid out.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
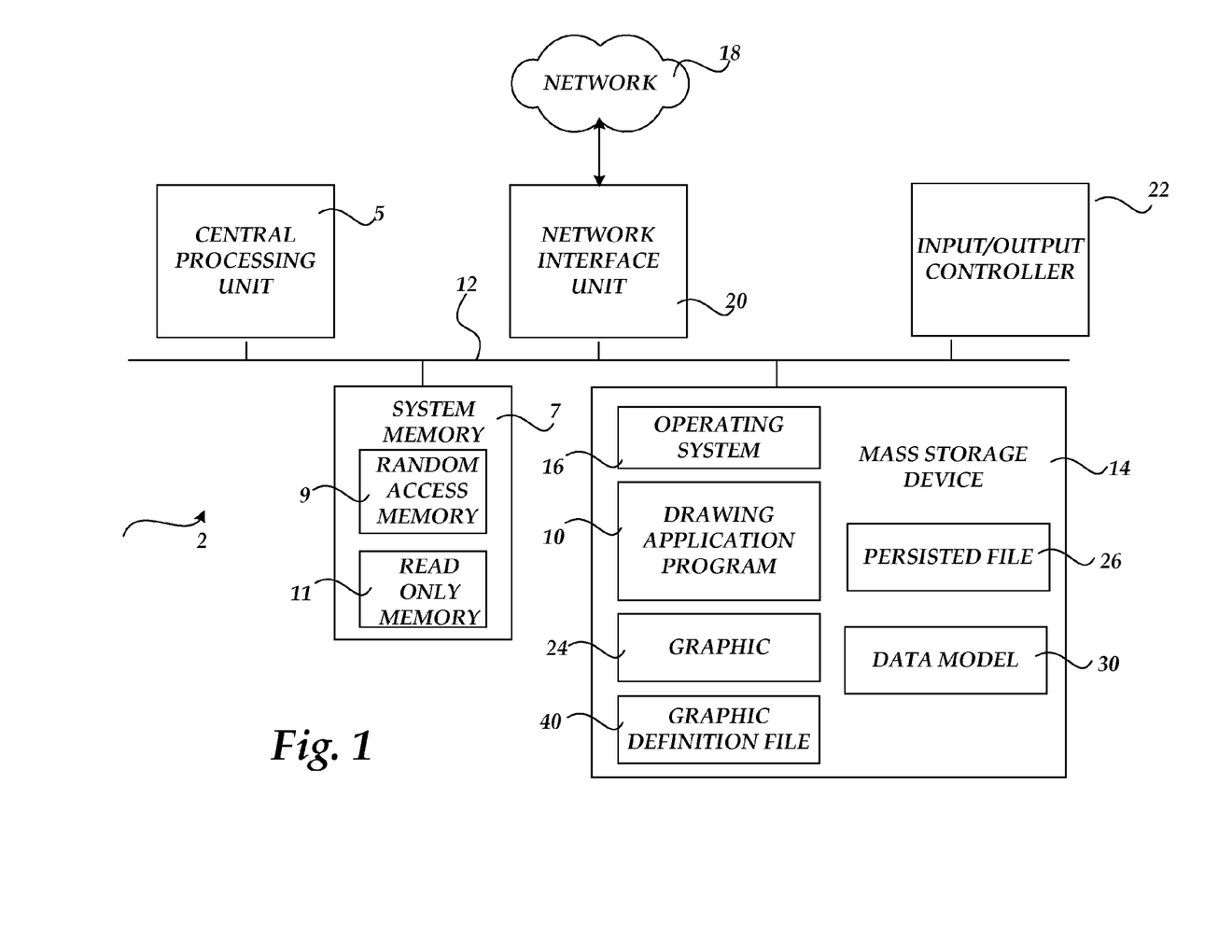
FIG. 1 is a computer system architecture graphic illustrating a computer system utilized in and provided by the various embodiments of the invention.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

Figure 2:
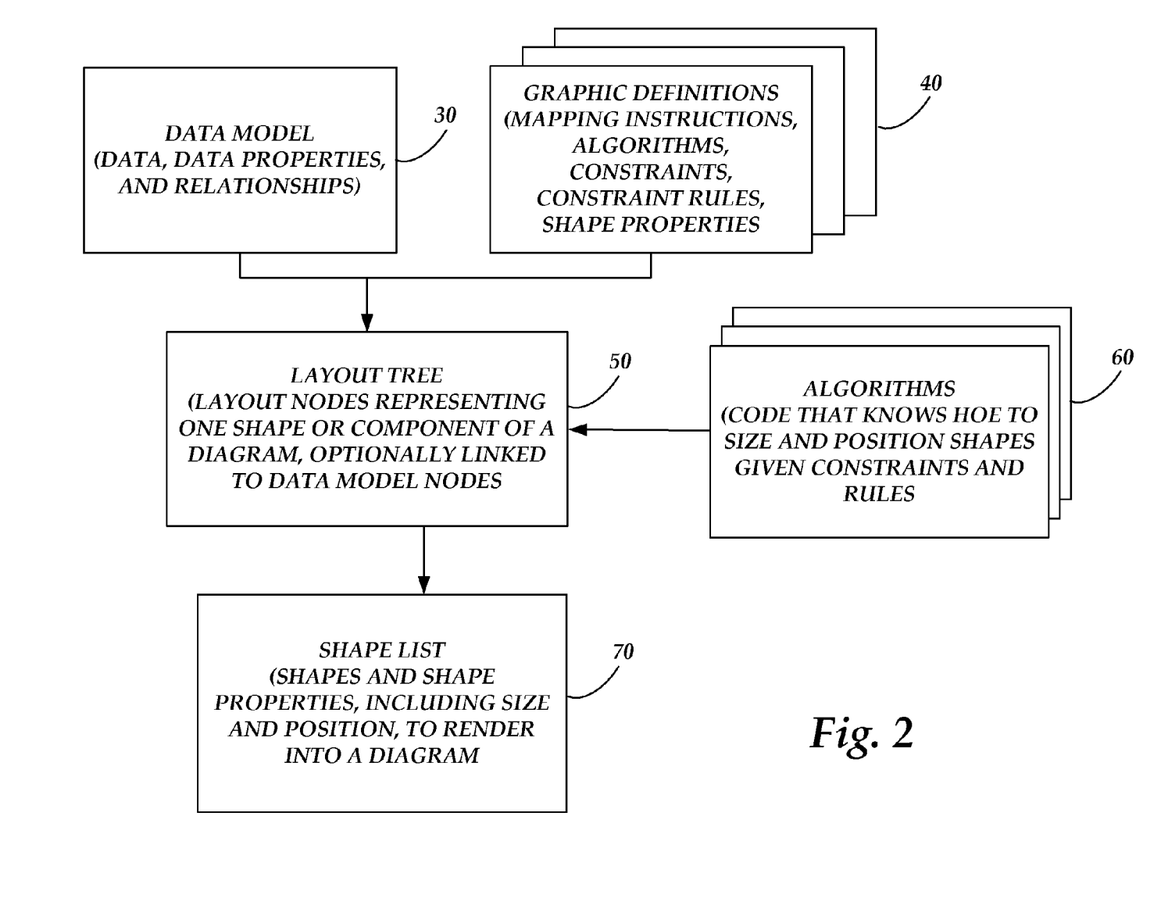
FIG. 2 is a block diagram of the various components which are utilized in the creation and layout of graphics within the drawing application program in the computer system of FIG. 1, according to the various embodiments of the invention.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a drawing application program 10. The drawing application program 10 is operative to provide functionality for the creation and layout of graphics, such as graphic 24. According to one embodiment of the invention, the drawing application program 10 comprises the OFFICE suite of application programs from MICROSOFT CORPORATION including the WORD, EXCEL, and POWERPOINT application programs. Referring now to FIG. 2, a block diagram of the various components which are utilized in the creation and layout of graphics within the drawing application program 10 is shown, according to the various embodiments of the invention. The various components include a data model 30, graphic definition 40, a layout tree 50, algorithms 60, and a shape list 70. In various embodiments of the invention, the drawing application program 10 reads in the graphic definition 40 for instructions regarding the creation and layout of graphics. It will be appreciated that in one embodiment of the invention, the data model 30 and the graphic definition file 40 may be stored as individual files in the computer system 2 which are accessed by the drawing application program 10.

The data model 30 includes a collection of nodes, relationships, text, and properties that contains the content for constructing the graphic 24. The graphic definition 40 is a collection of data which describes how to create a specific graphic layout. In various embodiments of the invention, the graphic definition 40 may be formatted according to extensible markup language ("XML"). As is understood by those skilled in the art, XML is a standard format for communicating data. In the XML data format, a schema is used to provide XML data with a set of grammatical and data type rules governing the types and structure of data that may be communicated. The XML data format is well-known to those skilled in the art, and therefore not discussed in further detail herein. The aspects of a graphic described by the graphic definition 40 include the name of a layout algorithm to use for each layout node, algorithm parameters, constraints, and constraint rules for constructing the layout tree, defaults for shape geometry and style properties, graphic classification data, and a sample data model.

Constraints are conditions used by a layout algorithm for creating a graphic. An example of a constraint is the value to be used for a shape's width. It will be appreciated that constraints may include numeric values or Boolean values. Numeric constraints can specify a specific numeric value (e.g., width=1 inch). Numeric constraints may also calculate their value by referring to other constraint values using references (e.g., height=width*0.75). Boolean constraints may include equality constraints which force all nodes in a set to have the same value for another constraint, and may include inequality constraints, where one constraint value is limited based on another constraint value (e.g. shape's width needs to be less-than or greater-than another shape's height). Constraints may be propagated between layout nodes to enforce equality between drawing elements (e.g., all normal nodes have the same font size) or inequality (e.g., width of transition nodes should be <=normal node width). Constraints may be propagated by attaching a shared propagator to a constraint which propagates its states to other layout nodes. It will be appreciated that both constraints and constraint rules may be updated on the other nodes from the propagating constraint. Constraint rules are a description of how to modify a set of constraints if they are unable to be met by a layout algorithm. For instance, a constraint may specify that a font size must be 14 points, but a constraint rule may specify that a font size can decrease to a minimum of 8 points. The graphic definition 40 will be discussed in greater detail with respect to FIG. 4, below.

The layout tree 34 is a collection of presentation elements, or layout nodes. A layout node is a node in the layout tree representing one shape or group of shapes that forms an element of the graphic 24. A layout node may be optionally linked to the nodes of the data model 30. The layout tree 34 stores data about the shapes that will compose a graphic, including the respective geometries, properties, text fitting, and placement of shapes.

The drawing application program 10 constructs the layout tree by mapping the data from the data model to the graphic layout information in the graphic definition to construct layout nodes, and associating algorithms, constraints and constraint rules with these layout nodes. It then utilizes the algorithm, constraints, and constraint rules to determine shape dimensions, text fitting, and shape placement prior to constructing the shape list 50 which is used to render the graphic 24 on the drawing canvas. Layout nodes will be discussed in greater detail, below. The layout tree 34 will be discussed in greater detail with respect to FIG. 3, below.

Figure 3:
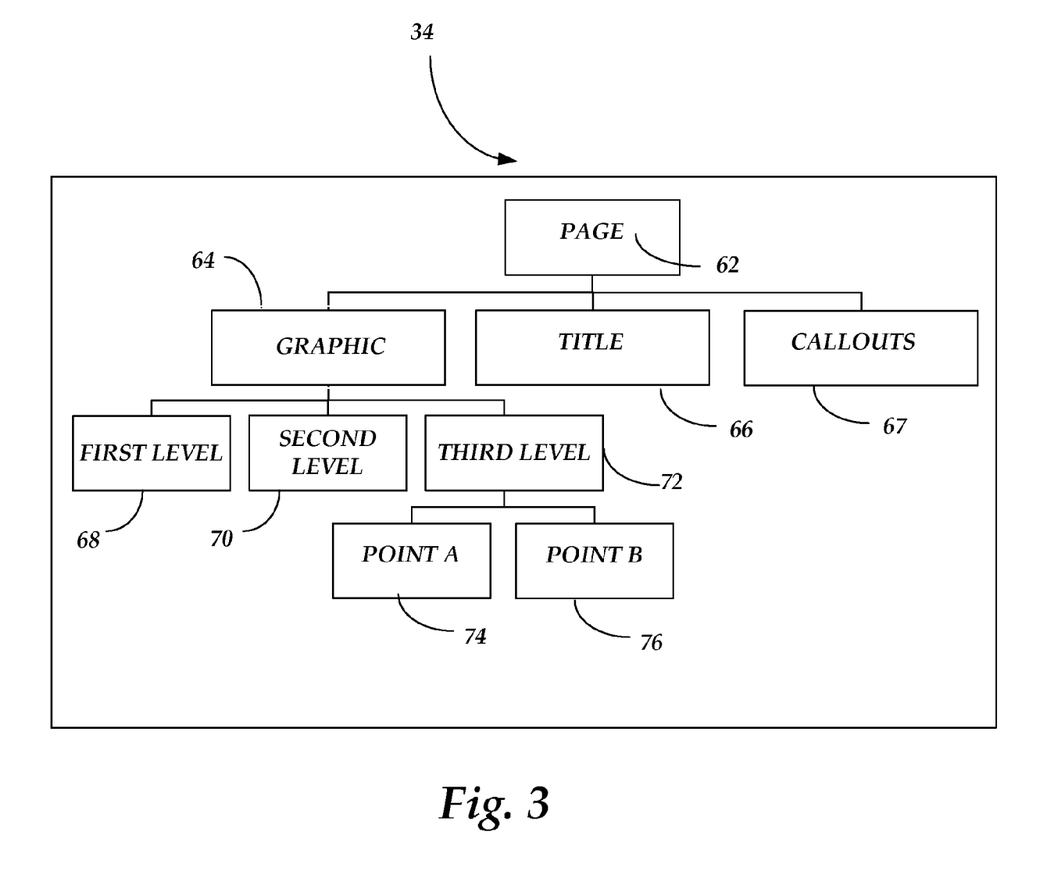
FIG. 3 is a block diagram of an illustrative layout tree, according to the various embodiments of the invention.

Referring now to FIG. 3, a block diagram of one instance of a layout tree 34 is shown, according to the various embodiments of the invention. It should be understood that the layout tree 34 shown in FIG. 3 is illustrative and that layout trees may be larger or smaller depending on the amount of data for the graphic and how the graphic layout is defined. The layout tree 34 includes a hierarchical arrangement of layout nodes to be utilized in laying out the graphic 24. In this instance, the layout nodes represent the overall page area to contain the graphic, page node 62. The children (or second level nodes) of the page node 62 include a graphic node 64, a title node 66, and a callouts node 67. The children of the graphic node 64 include a first level node 68, a second level node 70, and a third level node 72, representing the shapes that construct the diagram, and map back to data model elements. The third level node also has child nodes 74 (Point A) and 76 (Point B), which represent visible shapes and also map back to data model elements.

Figure 4:
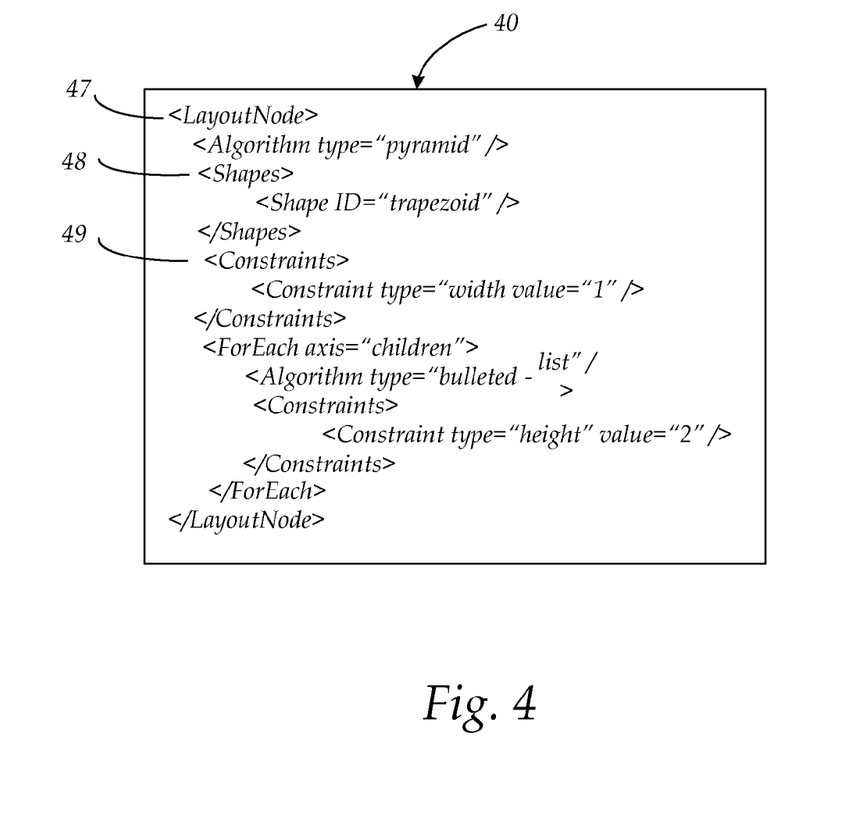
FIG. 4 is a block diagram of a portion of an illustrative graphic definition for generating a layout tree, according to the various embodiments of the invention.

Referring now to FIG. 4, a block diagram of a portion of the graphic definition 40 is shown, according to the various embodiments of the invention. As shown in FIG. 4, this implementation of the graphic definition is based on an XML schema that defines the layout of the graphic 24. The XML schema includes a LayoutNode tag 47, which has subtags including an Algorithm tag that defines the type of algorithm used to layout the graphic by a layout node (i.e., pyramid), a Shapes tag 48 for defining shapes which may be used in the graphic by a layout node (i.e., trapezoid), and a Constraints tag 49 for defining constraints.

Figure 5:
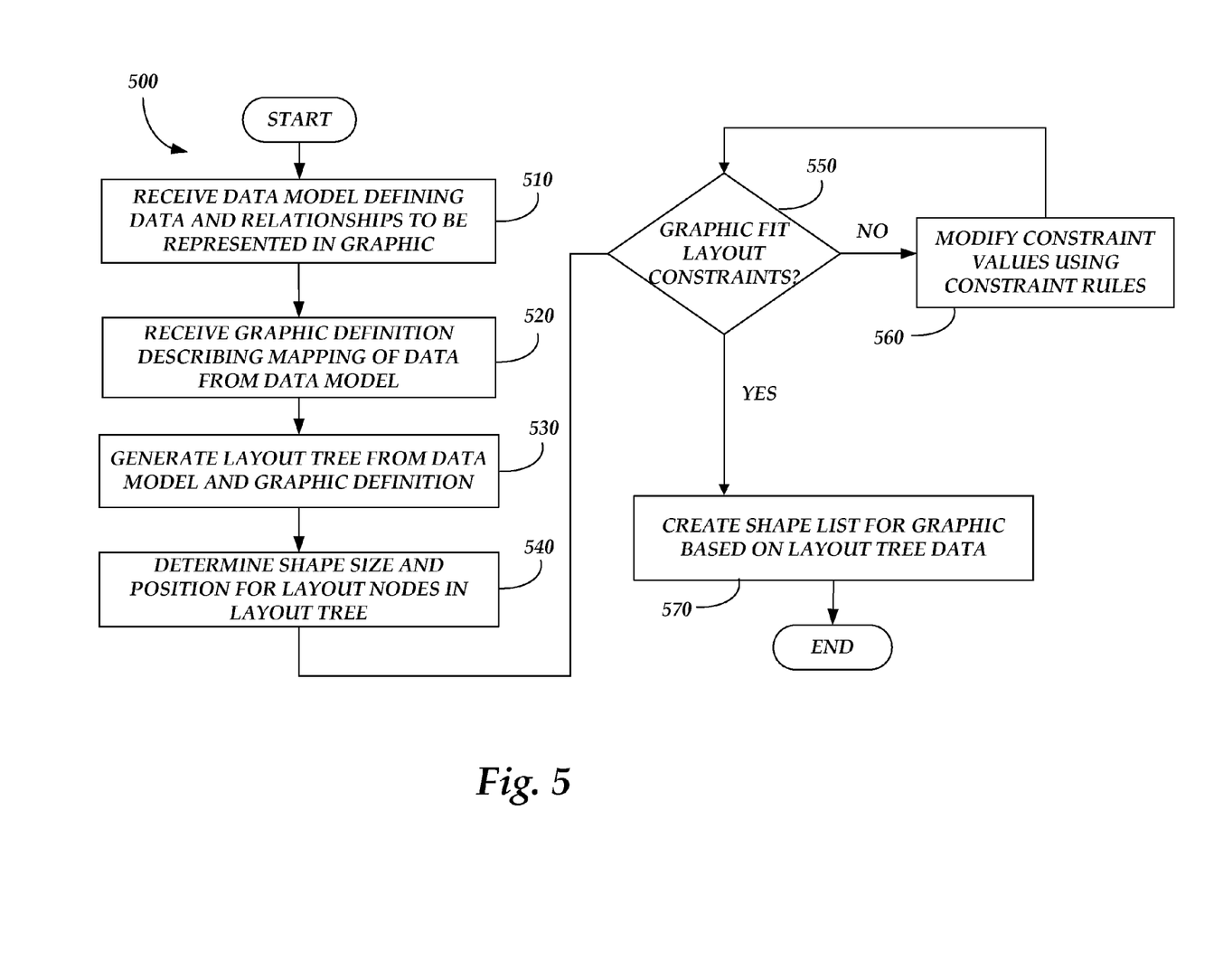
FIG. 5 is an illustrative routine performed by a drawing application program in the computer system of FIG. 1 for creating and laying out a graphic, according to an embodiment of the invention.

Referring now to FIG. 5, an illustrative routine 500 will be described illustrating a process performed by the drawing application program 10 for creating and laying out a graphic. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Referring now to FIG. 5, the routine 500 begins at operation 510, where the drawing application program 10 receives a data model defining the data and data relationships to be represented in the graphic to be created. It will be appreciated that the data and the data relationships determine the type and number of each layout node in the layout tree 34 generated by the layout framework, according to the patterns specified in the graphic definition.

The routine 500 continues from operation 510 to operation 520, where the drawing application program 10 receives a graphic definition describing one possibility for the mapping of the data from the data model to layout nodes specifying algorithms, parameters, constraints, constraint rules, and shape properties. It will be appreciated that the graphic definition 40 may be retrieved as a separate file, such as an XML file, stored in the computer system 2. In this manner, support is provided for the development of new graphic definitions which may be added by a user so that they may be read by the drawing application program 10. New graphic definitions can be created and retrieved without changes to the layout framework, allowing for an expanding set of graphics that the drawing application can lay out.

The graphic definition provides patterns for applying the algorithms, parameters, constraints, and constraint rules. As defined herein, algorithms are layout routines for positioning and sizing shapes and text. For instance, one algorithm might lay out shapes on a linear path while another algorithm might lay shapes out in a circular path. It will be appreciated that algorithms may take parameters to determine various placement options. For instance, a linear algorithm has parameters for direction and orientation which may be controlled through various drawing tool commands in the drawing application program 10. For instance, a tool may be provided in the drawing application 10 for altering one of the parameters of the layout algorithm to change the orientation of the graphic (e.g., left-to-right vs. right-to-left) or rotate the graphic. The algorithms also are external to the layout framework and can be added to expand the range of graphics that can be created without changes to the layout framework.

The routine 500 continues from operation 520 to operation 530, where the drawing application program 10 generates a layout tree from the received data model and the received graphic definition. In particular, the drawing application program 10 "walks through" the nodes in the data model 30 and maps the nodes and relationships from the data model to specific shapes and default style properties (e.g., formatting and text properties) according to the graphic definition (which may also be defined by an XML schema). As discussed above with respect to FIG. 2, the layout tree 34 includes data about the shapes that will compose a graphic, including the respective geometries, properties, text fitting, and placement of shapes. It will be appreciated that the layout tree is created by iterating through the data model 30 and creating layout nodes based on patterns defined in the graphic definition. Iterators provide instructions for constructing the layout tree by indicating how elements in the data model are read and matched to layout node patterns.

The routine 500 continues from operation 530 to operation 540, where the drawing application program 10 determines the shape size and position for the layout nodes in the layout tree, utilizing the algorithms, parameters, constraints, and constraint rules from the graphic definition. The routine 500 continues from operation 540 to operation 550, where the drawing application program 10 determines if the graphic to be rendered fits a layout space on the drawing canvas based on the constraint values.

If, at operation 550, the graphic to be rendered does not fit the layout space on the drawing canvas, the routine 500 continues to operation 560, where the drawing application program 10 modifies the constraint values using the constraint rules to fit the graphic into the layout space. In particular, the layout nodes in the layout tree 34 may include an ordered set of constraint rules which the drawing application program 10 may utilize to change the constraint values in an attempt to layout the graphic successfully within the layout space. According to various embodiments of the invention, the drawing application program 10 tries each rule in succession, moving on to the next rule only if the current rule does not allow the graphic to fit within the layout space. It will be appreciated that once the application program 10 has finished running through the rules list, it will automatically access a fallback rule list which forces the drawing elements to fit within the layout space on the drawing canvas by shrinking shapes and font size to a very small size, truncating text, or not placing shapes in the layout space.

It should be understood that the aforementioned graphic elements include shapes as well as text which fits inside shapes. Thus, the drawing application program 10 may also determine at operation 550 whether any of the text does not fit within the shapes in the layout space on the drawing canvas. It will be appreciated that text constraint rules as well as other rules may also be included in a layout node's constraint rule list to determine the order in which various techniques are applied to fit the text. These techniques may include growing the size of the shape or altering the text fit constraints (e.g., adjusting margins and font size). Text algorithms are associated with layout nodes of a layout tree where data exists in the data model. Other rules may include algorithms for determining the amount of space between two graphic elements. It will further be appreciated that other rules may utilize algorithms for determining the amount of space between two graphic elements, the relative position of graphic elements, etc.

If, at operation 550, the graphic to be rendered does fit the layout space on the drawing canvas, the routine 500 branches to operation 570, where the drawing application program 10 creates a shape list for the graphic to be created based on the layout tree data determined in operation 540. Once the nodes from the data model 30 and the relationships to specific shapes or shape properties are mapped, the shape list may be rendered on a drawing canvas. The routine 500 then ends.

Based on the foregoing, it should be appreciated that the various embodiments of the invention include a method and apparatus and computer-readable medium for managing specific types of content in an electronic document. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for creating and laying out a graphic within an application program, comprising:
   receiving a data model for constructing the graphic, the data model defining a set of data and data relationships to be represented in the graphic;
   receiving a graphic definition, the graphic definition describing the mapping of the data from the data model to layout nodes in a layout tree, wherein each layout node represents one or more shapes in the graphic;
   determining shape properties for each shape in the graphic based at least in part on the graphic definition by utilizing one or more algorithms, wherein the one or more algorithms are based at least in part on an ordered set of two or more constraint rules, and wherein the shape properties comprise at least a shape size and a shape position for each shape in the graphic;
   automatically modifying the graphic to fit in a layout space of a display by evaluating each constraint rule in succession and modifying a corresponding constraint value of at least one shape property until it is determined that the graphic fits in the layout space;
   creating a shape list comprising the one or more shapes and the shape properties based on the one or more algorithms; and
   providing the shape list to the application program for rendering the graphic.

2. The method of claim 1, further comprising:
   specifying a plurality of external graphic definitions, wherein each of the plurality of external graphic definitions specify information required to generate a specific graphic.

3. The method of claim 1, further comprising:
   specifying a plurality of external algorithms, wherein each of the plurality of external algorithms specifies a layout for the one or more shapes to achieve a specific graphic structure, and wherein each of the external algorithms is referenced by an external graphic definition.

4. The method of claim 1, wherein the shape size and the shape position for each shape in the graphic are defined by the one or more algorithms utilizing constraints and constraint rules.

5. The method of claim 4, wherein the constraints comprise one or more numeric constraints for use by the one or more algorithms, and wherein a numeric constraint represents a numeric value.

6. The method of claim 5, wherein at least one numeric constraint is derived by a reference to another constraint.

7. The method of claim 6, wherein a constraint is modified according to a set of constraint rules to size and position a layout node.

8. The method of claim 5, wherein the constraints comprise one or more Boolean constraints, wherein a Boolean constraint represents one of an equality and inequality of values across the one or more shapes, and wherein a numeric value of a numeric constraint is propagated to a shape specified by a Boolean constraint.

9. The method of claim 4, wherein a first layout node communicates constraints to a second layout node to enforce equality between a first shape and a second shape in the graphic.

10. The method of claim 1, wherein the graphic definition is provided in a markup language.

11. The method of claim 10, wherein the markup language is an extensible markup language (XML).

12. A computer system, comprising:
at least one processing unit; and
at least one memory, communicatively coupled to the at least one processing unit and containing computer-readable instructions that, when executed by the at least one processing unit, perform a method for creating and laying out a graphic, the method comprising:
receiving a data model for constructing the graphic, the data model defining a set of data and data relationships to be represented in the graphic;
receiving a graphic definition, the graphic definition describing the mapping of the data from the data model to layout nodes in a layout tree, wherein each layout node represents one or more shapes in the graphic;
determining shape properties for each shape in the graphic based at least in part on the graphic definition by utilizing one or more algorithms, wherein the one or more algorithms are based at least in part on an ordered set of two or more constraint rules, and wherein the shape properties comprise at least a shape size and a shape position for each shape in the graphic;
automatically modifying the graphic to fit in a layout space of a display by evaluating each constraint rule in succession and modifying a corresponding constraint value of at least one shape property until it is determined that the graphic fits in the layout space;
creating a shape list comprising the one or more shapes and the shape properties based on the one or more algorithms; and
providing the shape list to the application program for rendering the graphic.

13. The computer system of claim 12, further comprising:
specifying a plurality of external graphic definitions, wherein each of the plurality of external graphic definitions specify information required to generate a specific graphic.

14. The computer system of claim 12, further comprising:
specifying a plurality of external algorithms, wherein each of the plurality of external algorithms specifies a layout for the one or more shapes to achieve a specific graphic structure, and wherein each of the external algorithms is referenced by an external graphic definition.

15. The computer system of claim 12, wherein the shape size and the shape position for each shape in the graphic are defined by the one or more algorithms utilizing constraints and constraint rules.

16. The computer system of claim 15, wherein the constraints comprise one or more numeric constraints for use by the one or more algorithms, and wherein a numeric constraint represents a numeric value.

17. The computer system of claim 16, wherein at least one numeric constraint is derived by a reference to another constraint.

18. The computer system of claim 17, wherein a constraint is modified according to a set of constraint rules to size and position a layout node.

19. The computer system of claim 15, wherein the constraints comprise one or more Boolean constraints, wherein a Boolean constraint represents one of an equality and an inequality of values across the one or more shapes, and wherein a numeric value of a numeric constraint is propagated to a shape specified by a Boolean constraint.

20. The computer system of claim 15, wherein multiple layout nodes communicate constraint values to each other to enable sizing and positioning of the layout nodes using the constraints.

21. The computer system of claim 12, wherein the graphic definition is provided in a markup language.

22. The computer system of claim 21, wherein the markup language is an extensible markup language (XML).

23. A computer-readable medium having computer-executable instructions stored thereon which, when executed by a computer, will cause the computer to perform a method for creating and laying out a graphic within an application program, the method comprising:
receiving a data model for constructing the graphic, the data model defining a set of data and data relationships to be represented in the graphic;
receiving a graphic definition, the graphic definition describing the mapping of the data from the data model to layout nodes in a layout tree, wherein each layout node represents one or more shapes in the graphic;
determining shape properties for each shape in the graphic based at least in part on the graphic definition by utilizing one or more algorithms, wherein the one or more algorithms are based at least in part on an ordered set of two or more constraint rules, and wherein the shape properties comprise at least a shape size and a shape position for each shape in the graphic;
automatically modifying the graphic to fit in a layout space of a display by evaluating each constraint rule in succession and modifying a corresponding constraint value of at least one shape property until it is determined that the graphic fits in the layout space;
creating a shape list comprising the one or more shapes and the shape properties based on the one or more algorithms; and
providing the shape list to the application program for rendering the graphic.

24. The computer-readable medium of claim 23, further comprising:
specifying a plurality of external graphic definitions, wherein each of the plurality of external graphic definitions specify information required to generate a specific graphic.

25. The computer-readable medium of claim 23, further comprising:
specifying a plurality of external algorithms, wherein each of the plurality of external algorithms specifies a layout for the one or more shapes to achieve a specific graphic structure, and wherein each of the external algorithms is referenced by an external graphic definition.

26. The computer-readable medium of claim 23, wherein the shape size and the shape position for each shape in the graphic are defined by the one or more algorithms utilizing constraints and constraint rules.

27. The computer-readable medium of claim 26, wherein the constraints comprise one or more numeric constraints for use by the one or more algorithms, and wherein a numeric constraint represents a numeric value.

\* \* \* \* \*